(12) United States Patent
Yairi et al.

(10) Patent No.: US 9,423,875 B2
(45) Date of Patent: Aug. 23, 2016

(54) DYNAMIC TACTILE INTERFACE WITH EXHIBITING OPTICAL DISPERSION CHARACTERISTICS

(71) Applicant: Tactus Technology, Inc., Fremont, CA (US)

(72) Inventors: Micah Yairi, Fremont, CA (US); Christopher DeArmitt, Fremont, CA (US); Michael Hammersley, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 14/471,842

(22) Filed: Aug. 28, 2014

(65) Prior Publication Data

US 2015/0077363 A1    Mar. 19, 2015

Related U.S. Application Data

(60) Provisional application No. 61/871,081, filed on Aug. 28, 2013.

(51) Int. Cl.
*G06F 3/01* (2006.01)
*G06F 3/041* (2006.01)
*G06F 3/0488* (2013.01)

(52) U.S. Cl.
CPC .............. *G06F 3/016* (2013.01); *G06F 3/041* (2013.01); *G06F 3/04886* (2013.01); *G06F 2203/04809* (2013.01)

(58) Field of Classification Search
None
See application file for complete search history.

(56) References Cited

U.S. PATENT DOCUMENTS

| 3,034,628 A | 5/1962 | Wadey |
| 3,659,354 A | 5/1972 | Sutherland |

(Continued)

FOREIGN PATENT DOCUMENTS

| CN | 1260525 A | 7/2000 |
| CN | 1530818 A | 9/2004 |

(Continued)

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracaderny.eu/sites/default/files/9.Materials.pdf>.

(Continued)

*Primary Examiner* — Aneeta Yodichkas
*Assistant Examiner* — Karin Kiyabu
(74) *Attorney, Agent, or Firm* — Jeffrey Schox

(57) ABSTRACT

One variation of a dynamic tactile interface for a computing device includes: a tactile layer defining a peripheral region and a deformable region adjacent the peripheral region; a substrate including a transparent base material exhibiting a first optical dispersion characteristic, coupled to the tactile layer at the peripheral region, defining a fluid conduit adjacent the peripheral region and a fluid channel fluidly coupled to the fluid conduit; a volume of transparent fluid contained within the fluid channel and the fluid conduit and exhibiting a second optical dispersion characteristic different from the first optical dispersion characteristic; a volume of particulate contained within the transparent base material of the substrate, biased around the fluid conduit, and exhibiting a third optical dispersion characteristic different from the first optical dispersion characteristic; and a displacement device displacing fluid into the fluid channel to transition the deformable region from a retracted setting into an expanded setting.

17 Claims, 5 Drawing Sheets

(56) References Cited

U.S. PATENT DOCUMENTS

| | | |
|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,496,175 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |

(56) References Cited

U.S. PATENT DOCUMENTS

| | | |
|---|---|---|
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |

(56) References Cited

U.S. PATENT DOCUMENTS

| | | |
|---|---|---|
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 9,075,429 B1 | 7/2015 | Karakotsios |
| 9,116,617 B2 | 8/2015 | Ciesla et al. |
| 9,274,635 B2 | 3/2016 | Birnbaum |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | McKillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |

(56) References Cited

U.S. PATENT DOCUMENTS

| | | |
|---|---|---|
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| JP | 63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 200907572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Lind. "Two Decades of Negative Thermal Expansion Research: Where Do We Stand?" Department of Chemistry, the University of Toledo, Materials 2012, 5, 1125-1154; doi: 10.3390/ma5061125, Jun. 20, 2012 pp. 1125-1154. [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. May 31, 2004, 7 Pages.

Preumont, A. Vibration Control of Active Structures; An Introduction, Jul. 2011.

→ MOLDED, EXTRUDED

→ IMPREGNATED

DYNAMIC TACTILE INTERFACE WITH EXHIBITING OPTICAL DISPERSION CHARACTERISTICS

CROSS REFERENCE TO RELATED APPLICATIONS

This application claims the benefit of U.S. Provisional Application No. 61/871,081, filed on 28 Aug. 2013, which is incorporated in its entirety by this reference.

This application is related to U.S. patent application Ser. No. 11/969,848, filed on 4 Jan. 2008, Ser. No. 12/319,334, filed on 5 Jan. 2009, Ser. No. 12/497,622, filed on 3 Jan. 2009, Ser. No. 12/652,704, filed on 5 Jan. 2010, Ser. No. 12/830,430, filed on 5 Jul. 2010, and Ser. No. 14/035,851, filed on 24 Sep. 2013, which are incorporated in their entireties by this reference.

TECHNICAL FIELD

This invention relates generally to the field of touch-sensitive displays, and more specifically to a dynamic tactile interface for a touch-sensitive display.

DESCRIPTION OF THE PREFERRED EMBODIMENTS

The following description of the preferred embodiment of the invention is not intended to limit the invention to these preferred embodiments, but rather to enable any person skilled in the art to make and use this invention.

1. Dynamic Tactile Interface

Figure 4:
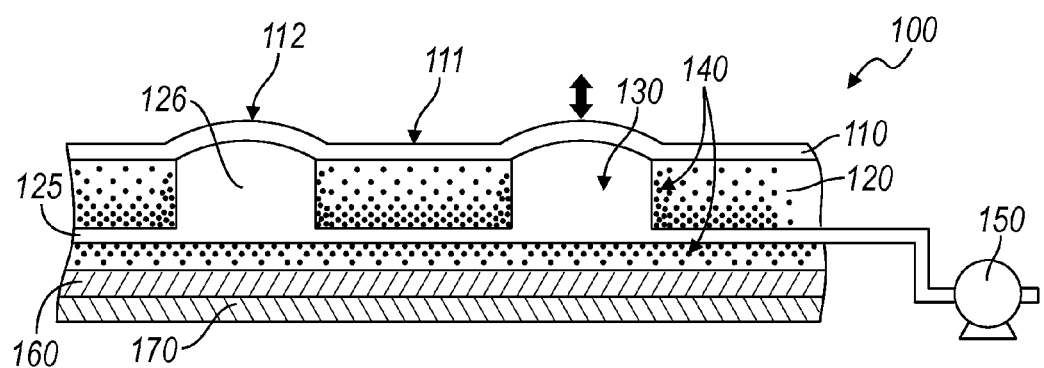
FIG. 4 is a schematic representation of one variation of the dynamic tactile interface.

As shown in FIG. 4, a dynamic tactile interface 100 includes: a tactile layer 110 defining a peripheral region 111 and a deformable region 112 adjacent the peripheral region 111; a substrate 120 including a transparent base material exhibiting a first optical dispersion characteristic, coupled to the tactile layer 110 at the peripheral region 111, defining a fluid conduit 126 adjacent the peripheral region 111, and defining a fluid channel 125 fluidly coupled to the fluid conduit 126; a volume of transparent fluid 130 contained within the fluid channel 125 and the fluid conduit 126, the volume of transparent fluid 130 exhibiting a second optical dispersion characteristic different from the first optical dispersion characteristic; a volume of particulate 140 contained within the transparent base material of the substrate 120 and biased around the fluid conduit 126, the volume of particulate 140 exhibiting a third optical dispersion characteristic different from the first optical dispersion characteristic; and a displacement device 150 displacing fluid into the fluid channel 125 to transition the deformable region 112 from a retracted setting (shown in FIG. 1B) into an expanded setting (shown in FIG. 1A), the deformable region 112 defining a formation tactilely distinguishable from the peripheral region 111 in the expanded setting.

Figure 5:
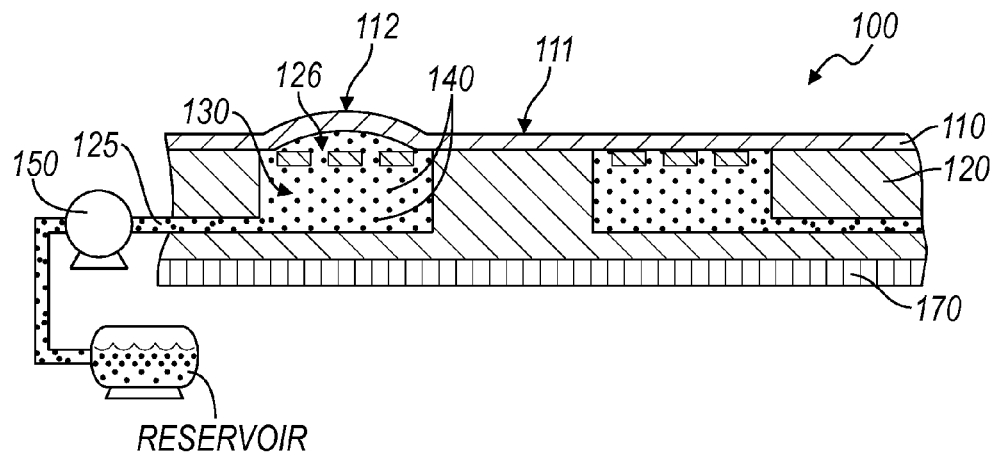
FIG. 5 is a schematic representation of one variation of the dynamic tactile interface.

As shown in FIG. 5, one variation of the dynamic tactile interface 100 includes: a tactile layer 110 defining a peripheral region 111 and a deformable region 112 adjacent the peripheral region 111; a substrate including a transparent material exhibiting a first thermal expansion coefficient, coupled to the tactile layer 110 at the peripheral region 111, defining a fluid conduit adjacent the peripheral region 111, and defining a fluid channel fluidly coupled to the fluid conduit 126; a volume of transparent fluid 130 contained within the fluid channel 125 and the fluid conduit 126, the volume of transparent fluid 130 exhibiting a second thermal expansion coefficient greater than the first thermal expansion coefficient; a volume of particulate commingled with the volume of transparent fluid 130 and exhibiting a third thermal expansion coefficient less than the second thermal expansion coefficient; and a displacement device 150 displacing a fluid into the fluid channel 125 to transition the deformable region 112 from a retracted setting into an expanded setting, the deformable region 112 defining a formation tactilely distinguishable from the peripheral region 111 in the expanded setting.

Figure 6:
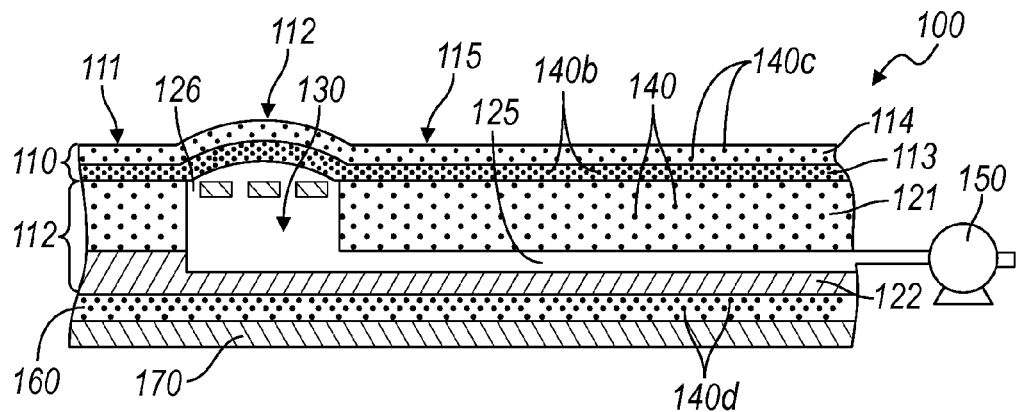
FIG. 6 is a schematic representation of one variation of the dynamic tactile interface.

As shown in FIG. 6, one variation of the dynamic tactile interface 100 includes: a tactile layer 110 defining a peripheral region 111 and a deformable region 112 adjacent the peripheral region 111, the tactile layer 110 including a first transparent material exhibiting a first index of refraction; a substrate including a first sublayer 121 and a second sublayer, the first sublayer 121 coupled to the tactile layer 110 at the peripheral region 111, the second sublayer adjacent the first sublayer 121 opposite the tactile layer 110 and including a second transparent material of a second index of refraction, the substrate 120 defining a fluid conduit adjacent the peripheral region 111 and a fluid channel fluidly coupled to the fluid conduit 126; a volume of particulate 140 arranged within the first sublayer 121, the volume of particulate 140 and the first sublayer 121 cooperating to exhibit a bulk index of refraction between the first index of refraction and the second index of refraction for a particular wavelength of light in the visible spectrum; a volume of transparent fluid 130 contained within the fluid channel 125 and the fluid conduit 126; and a displacement device 150 displacing fluid into the fluid channel 125 to transition the deformable region 112 from a retracted setting into an expanded setting, the deformable region 112 defining a formation tactilely distinguishable from the peripheral region 111 in the expanded setting.

The dynamic tactile interface 100 can further include a display coupled to the substrate 120 opposite the tactile layer no and displaying an image of a key substantially aligned with the deformable region 112 and/or a touch sensor 160 coupled to the substrate 120 and outputting a signal corresponding to an input on a tactile surface 115 of the tactile layer 110 adjacent the deformable region 112. The dynamic tactile interface 100 can also include a housing 180 that transiently engages a mobile computing device and transiently retains the substrate 120 over a digital display 170 of the mobile computing device.

2. Applications

Generally, the dynamic tactile interface 100 can be implemented within or in conjunction with a computing device to provide tactile guidance to a user entering input selections through a touchscreen or other illuminated surface of the computing device. In particular the dynamic tactile interface 100 defines one or more deformable regions of a tactile layer 110 that can be selectively expanded and retracted to intermittently provide tactile guidance to a user interacting with the computing device. In one implementation, the dynamic tactile interface 100 is integrated into or applied over a touchscreen of a mobile computing device, such as a smartphone or a tablet. For example, the dynamic tactile interface 100 can include a set of round or rectangular deformable regions, wherein each deformable region 112 is substantially aligned with a virtual key of a virtual keyboard rendered on the a display integrated into the mobile computing device, and wherein each deformable region 112 in the set mimics a physical hard key when in an expanded setting. However, in this example, when the virtual keyboard is not rendered on the display 170 of the mobile computing device, the dynamic tactile interface 100 can retract the set of deformable regions to yield a substantially uniform (e.g., flush) tactile surface 115 yielding reduced optical distortion of an image rendered on the display 170. In another example, the dynamic tactile interface 100 can include an elongated deformable region 112 aligned with a virtual 'swipe-to-unlock' input region rendered on the display 170 such that, when in the expanded setting, the elongated deformable region 112 provides tactile guidance for a user entering an unlock gesture into the mobile computing device. Once the mobile computing device is unlocked responsive to the swipe gesture suitably aligned with the virtual input region, the dynamic tactile interface 100 can transition the elongated deformable region 112 back to the retracted setting to yield a uniform surface over the display 170.

The dynamic tactile interface 100 can alternatively embody an aftermarket device that adds tactile functionality to an existing computing device. For example, the dynamic tactile interface 100 can include a housing 180 (shown in FIG. 7) that transiently engages an existing (mobile) computing device and transiently retains the substrate 120 over a digital display 170 of the computing device. The displacement device 150 of the dynamic tactile interface 100 can thus be manually or automatically actuated to transition the deformable region(s) 112 of the tactile layer 110 between expanded and retracted settings.

Elements of the dynamic tactile interface 100, such as the substrate 120 and the tactile layer 110, can be substantially transparent to enable light transmission from the display 170 to a user, such as described in U.S. patent application Ser. No. 11/969,848, filed on 4 Jan. 2008, Ser. No. 12/319,334, filed on 5 Jan. 2009, Ser. No. 12/497,622, filed on 3 Jan. 2009, and Ser. No. 12/652,704, filed on 5 Jan. 2010, and U.S. Provisional Application Nos. 61/713,396, filed on 12 Oct. 2012, and 61/841,176, filed 28 Jun. 2013, which are incorporated in their entireties by this reference.

However, the substrate 120 and the (volume of transparent) fluid can be of different materials and can therefore exhibit different indices of refraction at various wavelengths of light within the visible spectrum (~390 to ~700 nm). For example, the substrate 120 can include a base material of acrylic (PMMA), polycarbonate, silicone, glass (e.g., alkali-aluminosilicate glass), or other transparent material, and the fluid can be water, an alcohol, an oil, or air. As described below, the substrate 120 defines a fluid channel and a fluid conduit through which fluid is communicated to the back surface of the tactile layer 110 at the deformable region 112 to transition the deformable region 112 into the expanded setting, and the fluid channel 125 and the fluid conduit 126 may therefore contain fluid throughout various (e.g., all) periods of operation the dynamic tactile interface 100. An acute change in refractive index, optical dispersion, or other optical property may therefore occur at a junction (or "interface") between the disparate materials of the fluid 130 and the substrate 120—such as at a wall of the fluid channel 125 or at a wall of the fluid conduit 126—such that light output from a display below the substrate 120 (i.e., adjacent the substrate 120 opposite the tactile layer 110) to reflect internally back toward the display 170, thereby reducing a perceived brightness of the display 170 and reducing a maximum angle of off-axis viewing of the display 170 through the substrate 120 and the tactile layer 110. Similarly, this junction between disparate materials can cause various wavelengths of light output from the display 170 to refract (i.e., "bend") through the junction at different angles (i.e., as a function of wavelength), thereby yielding local chromatic dispersion of a portion of an image output from the display 170 adjacent the junction.

In one example, the fluid 130 and the substrate 120 are index-matched at a particular wavelength near the center of the visible spectrum (e.g., at approximately 550 nm, in the green light spectrum) but exhibit increasingly different refractive indices at wavelengths further from this particular wavelength in the visible spectrum. In this example, the distinct change in optical dispersion characteristics of the substrate material and the fluid 130 at frequencies of ~400 nm (violet light) and ~750 nm (red light) may thus cause violet lines and red lines to appear (to a user) along an edge of the fluid channel 125 and/or along an edge of the fluid conduit 126.

In another example, the fluid 130 and the substrate 120 are index-matched near a lower wavelength end of the visible spectrum, such as near 400 nm, but exhibit increasingly different refractive indices at higher wavelengths of light. In this example, the junction between the fluid 130 and the substrate 120 may cause parallel yellow, orange, and red lines along the fluid channel 125 and/or along the fluid conduit 126 to appear to a user viewing a digital display 170 through the substrate 120 and the tactile layer no. Therefore, though the fluid 130 and the base material of the substrate 120 may be of similar transparency, optical clarity, and/or index of refraction at one wavelength of light or across a limited range of the visible spectrum, a user may nonetheless perceive optical distortion of an image—rendered on an adjacent digital display 170—in the form of wavelength-dependent refraction of light (i.e., chromatic dispersion) proximal junctions between disparate materials of the dynamic tactile interface 100, such as along the fluid channel 125 and/or along the fluid conduit 126.

Therefore, particulate can be impregnated or suspended in locally in regions of the base material of the substrate 120—such as around the fluid channel 125 and/or the fluid conduit 126—to modify local optical dispersion properties (e.g., variations in refractive index as a function wavelength) of the substrate 120 to better approximate optical dispersion properties of the fluid 130 contained within the fluid channel 125 and the fluid conduit 126. In particular, particulate can be preferentially impregnated or suspended in the substrate 120 around the fluid channel 125 and/or the fluid conduit 126 such that a bulk optical dispersion characteristic of this portion of the substrate 120 better matches optical dispersion characteristics of the adjacent fluid yields a relatively smoother transition of index of refraction through the substrate 120, the volume of fluid 130, and the tactile layer no. For example and as described below, if the fluid 130 is characterized by an Abbe number less than a Abbe number of the substrate 120, the particulate 140 can be of a metal-oxide (e.g., indium-tin oxide (ITO), titanium oxide ($TiO_2$), or aluminum oxide ($AlO_2$)) exhibiting a lower Abbe number (V-number, constringence) than the substrate 120 base material such that the combination of particulate 140 and the base material of the substrate 120 yields an effective (i.e., bulk) Abbe number that better matches the Abbe number of the fluid 130. Thus, when mixed into, impregnated into, or otherwise added to the base material of the substrate 120, the particulate can locally modify a bulk chromatic dispersion characteristic of the substrate 120, thereby smoothing transition of this chromatic dispersion characteristic at the junction between the fluid 130 and the substrate 120 and yielding less chromatic dispersion and internal reflection of light transmitted from the digital display 170 and incident on this junction.

Generally, the Abbe number of a material quantitatively describes the variation in index of refraction of the material as a function of wavelength. Modifying a bulk (e.g., effective) Abbe number of a material, such as described herein, may therefore indicate a (relative) change in the refractive indices of the material as a function of wavelength. In particular, adjacent materials characterized by substantially similar Abbe numbers may exhibit less chromatic dispersion of light passing there through than for a pair of adjacent materials characterized by substantially dissimilar Abbe numbers. Therefore, by adding particulate to the substrate 120 to modify the effective Abbe number of the substrate 120—and more specifically the effective refractive indices of the substrate 120 as a function of wavelength—the junction between the substrate 120 and the fluid 130 may yield less chromatic dispersion of light incident thereon, thereby yielding less perceived optical distortion of this light. Abbe numbers of base materials and bulk Abbe numbers of combinations of base material and particulate combinations are thus described herein to indicate wavelength-dependent refractive indices of a base material or combination of materials.

Furthermore, lateral junctions between elements of different materials—and therefore different optical properties—within and around the dynamic tactile interface 100 can also yield internal reflection and refraction of light transmitted therethrough. For example, junctions between the substrate 120 and the tactile layer 110, between adjacent sublayers of the substrate 120, between adjacent sublayers of the tactile layer 110, between the tactile layer 110 and ambient air, and/or between the substrate 120 and a display, touch sensor 160, or touchscreen, etc. can yield optic aberrations and reduced image brightness due to discrete changes in materials across these junctions. Particulate can therefore be mixed, impregnated, or otherwise added to various layers and/or sublayers of elements of the dynamic tactile interface 100 to smooth changes in optical properties across junctions between these layers and sublayers. In particular, particulate can be incorporated into various layers and/or sublayers of the dynamic tactile interface 100 at substantially uniform densities at constant depth through the layers and sublayers and varying densities dependent on depth to yield substantially smooth transitions in index of refraction, chromatic dispersion, and/or other optical property throughout the thickness of the dynamic tactile interface 100.

Particulate can also be incorporated (e.g., mixed into, dissolved into, suspended in) the volume of fluid 130 to yield a bulk optical property of the fluid 130/particulate 140 combination that better match that of the substrate 120. For example, particulate can be mixed into the volume of fluid 130 to better match a bulk coefficient of thermal expansion of the fluid 130/particulate 140 combination to the coefficient of thermal expansion of the surrounding substrate. Thus, because index of refraction may be dependent on temperature, a change in index of refraction of the fluid 130/particulate 140 combination with temperature may better track a change in index of refraction of the substrate 120 for a given temperature of the dynamic tactile interface 100.

One or more of the foregoing variations can be implemented within the dynamic tactile interface 100 to improve optical clarity and reduce optical aberrations (e.g., internal reflection, refraction, diffraction, etc.) within the dynamic tactile interface 100. For example, multiple volumes of similar or dissimilar particulate can be incorporated into the substrate 120 (e.g., shown as particulate 140 in FIG. 6), the tactile layer 110 (e.g., shown as particulate 140B and particulate 140C in FIG. 6), a sheet of a touch sensor 160 (e.g., as shown particulate 140D in FIG. 6), and/or the volume of fluid 130 (e.g., as particulate 140 in FIG. 5), etc. to reduce chromatic dispersion across lateral material junctions, to reduce refraction and internal reflection across horizontal area junctions (i.e., between layers and sublayers), and to reduce changes in optical performance of the dynamic tactile interface 100 with changes in ambient and/or operating temperatures.

3. Particulate

The volume of particulate 140 exhibits an optical property distinct from an optical property of a base material of the dynamic tactile interface 100 that contains the volume of particulate 140, and the volume of particulate 140 cooperates with the base material that contains it to exhibit a different, controlled bulk optical property. In particular, the volume of particulate 140 functions to locally or globally modify a bulk optical property of a base material containing it to yield smoother transitions in the optical property (e.g., index of refraction, chromatic dispersion, Abbe number, etc.) between adjacent materials of the dynamic tactile interface 100, such as between fluid-substrate junctions, substrate-tactile layer 110 junctions, etc.

In one implementation, the transparent base material of the substrate 120 exhibits a first optical dispersion characteristic; the volume of fluid 130 exhibits a second optical dispersion characteristic; and the volume of particulate 140 exhibits a third optical dispersion characteristic different from the first optical dispersion characteristic, is contained within the transparent base material, and cooperates with the base material to exhibit a bulk optical dispersion characteristic nearer (i.e., that better approximates) the second optical dispersion characteristic of the volume of fluid 130 than the base material of the substrate 120 alone. In this implementation, the particulate can be biased (e.g., preferentially impregnated) around the fluid conduit 126, as described below, to locally modify the bulk optical dispersion characteristic of the substrate 120 around the fluid channel 125 and/or the fluid conduit 126 and to yield a substantially smooth transition back to the first optical dispersion characteristic in the remaining volume of the substrate 120. For example, the transparent base material of the substrate 120 can be characterized by a first constringence value; the volume of transparent fluid 130 can be characterized by a second constringence value less than the first constringence value; and particulate in the volume of particulate 140 can be characterized by a third constringence value less than the second constringence value. In this example, a portion of the substrate 120 and a portion of the volume of particulate 140 impregnated into the substrate 120 proximal a surface of the fluid conduit 126 can thus cooperate to exhibit a fourth constringence value approximating the second constringence value of the fluid 130.

Furthermore, in the foregoing implementation, an amount of particulate added to the substrate material (e.g., in suspension) can be set to achieve a target bulk refractive index of the substrate 120 for a particular wavelength of light, such as to mimic a refractive index of the fluid 130 at the particular wavelength of light. Similarly, the amount of particulate added to the substrate material can be selected to achieve a target shift in a refractive index-wavelength curve characterizing the substrate 120 to better match a refractive index-wavelength curve characterizing the fluid 130. Thus, in this implementation, particulate can be preferentially incorporated into the substrate 120 to smooth lateral transitions in one or more optical properties proximal junctions between various base materials.

In one variation, the tactile layer 110 exhibits a first index of refraction; the substrate 120 includes a first sublayer 121 and a second sublayer 122 that cooperate to define and enclose the fluid channel 125; the first sublayer 121 coupled to the tactile layer no at the peripheral region 111; and the second sublayer 122 adjacent the first sublayer 121 opposite the tactile layer 110 and including a second transparent material of a second index of refraction, as shown in FIG. 6. In this variation, the volume of particulate 140 is interspersed throughout the first sublayer 121 and cooperates with the first sublayer 121 to exhibit a bulk index of refraction between the first index of refraction and the second index of refraction. In this variation, the volume of particulate 140 can be impregnated in the first sublayer 121 at a density (or concentration) varying with depth through the first sublayer 121 (shown in FIG. 2C), and a first portion of the volume of particulate 140 and the first sublayer 121 adjacent the tactile layer no can thus cooperate to exhibit a bulk index of refraction approximating the first index of refraction of the tactile layer 110. A second portion of the volume of particulate 140 and the first sublayer 121 adjacent the second sublayer 122 can thus cooperate to exhibit a bulk index of refraction approximating the second index of refraction of the second sublayer 122 of the substrate 120. Thus, in this variation, particulate can be incorporated into the substrate 120 (and/or the tactile layer 110, etc.) to smooth transitions in one or more optical properties proximal junctions between various base materials through the depth of the dynamic tactile interface 100.

As in the foregoing implementation and variation, the volume of particulate 140 can include indium-tin oxide (ITO) particulate, titanium oxide ($TiO_2$) particulate, aluminum oxide ($AlO_2$) particulate, highly-porous silica, or particulate of any other material (e.g., metal oxide) that is substantially transparent or translucent. The volume of particulate 140 can include nanoparticles (i.e., particulate sized between one and one hundred nanometers) and can include particulate of any suitable size range, such as 2-80 nm or 51-55 nm. However, the particulate can be of any other suitable material, size, range of sizes, etc.!

In yet another variation, the substrate 120 exhibits a first thermal expansion coefficient; the volume of transparent fluid 130 (contained within the fluid channel 125 and the fluid conduit 126 within the substrate 120) exhibits a second thermal expansion coefficient greater than the first thermal expansion coefficient; and the volume of (non-agglomerated) particulate is commingled with the volume of transparent fluid 130 and exhibits the third thermal expansion coefficient less than the second thermal expansion coefficient. In this variation, the particulate can exhibit a negative coefficient of thermal expansion such that the bulk thermal expansion coefficient of the volume of fluid 130 (with the particulate mixed or dissolved therein) better approximates the thermal expansion coefficient of the adjacent substrate. Thus, when the temperature of the dynamic tactile interface 100 increases, the substrate 120 and the fluid 130 can expand at similar rates such that a corresponding change in an optical property of the fluid 130 better tracks a change in the optical property of the substrate 120. For example, the volume of particulate 140 can include cubic zirconium tungstate nanoparticles commingled with the volume of fluid 130 within the fluid channel 125 and the fluid conduit 126. In this example, a filter can be arranged between the fluid channel 125 and the displacement device 150 to substantially prevent the particulate from exiting the substrate 120 and returning to the displacement device 150 and/or to a connected reservoir.

Alternatively, the volume of particulate 140 can exhibit a substantially high coefficient of thermal expansion and can be interspersed throughout the substrate 120 such that a bulk coefficient of thermal expansion of the substrate 120 and the volume of particulate 140 better approximates (e.g., approaches) the coefficient of thermal expansion of the volume of fluid 130. The dynamic tactile interface can also include a first discrete volume of particulate and a second discrete volume of particulate, the first discrete volume of particulate interspersed throughout the fluid to reduce the bulk coefficient of thermal expansion of the volume of fluid 130, and the second discrete volume of particulate interspersed throughout the substrate to increase the bulk coefficient of thermal expansion of the substrate 120 substantially up to the bulk coefficient of thermal expansion of the volume of fluid 130.

The dynamic tactile interface 100 can therefore include one or more discrete volumes of particulate of the same or different material. For example, the dynamic tactile interface 100 can include: a first volume of indium tin oxide nanoparticles interspersed throughout a second sublayer 114 of the tactile layer 110 in a first density to smooth a transition in index of refraction between the tactile layer 110 and ambient air; a second volume of indium tin oxide nanoparticles interspersed throughout a first sublayer 113 of the tactile layer 110 in a second density to smooth a transition in index of refraction between the substrate 120 below and the tactile layer 110; a third volume of indium tin oxide nanoparticles preferentially impregnated into the substrate 120 around the fluid channel 125 and the fluid conduit 126 to smooth a transition in index of refraction between the substrate 120 and the fluid 130; and/or a fourth volume of cubic zirconium tungstate nanoparticles commingled within the volume of fluid 130 within the fluid channel 125 and the fluid conduit 126 to better match a thermal expansion coefficient of the fluid 130 to a thermal expansion coefficient of the substrate 120.

Figures 3, 3A:
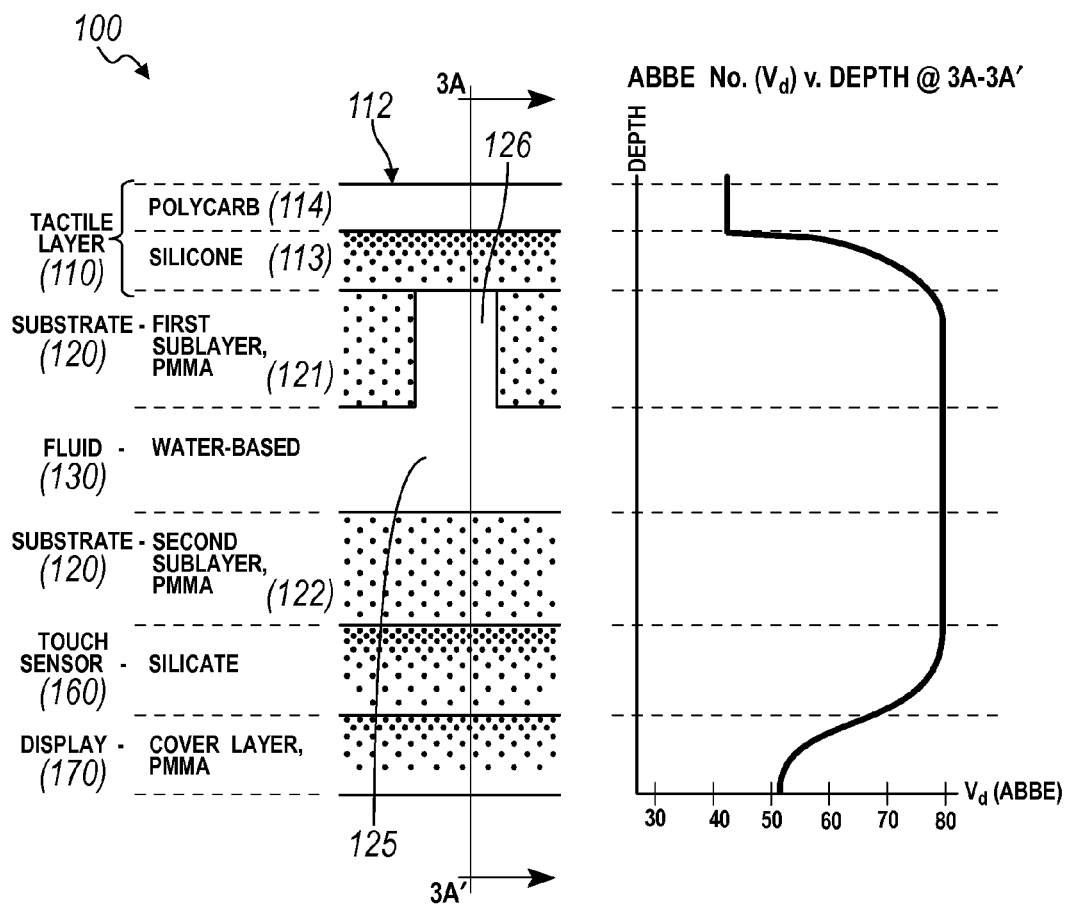
FIG. 3 is a graphical representation of one variation of the dynamic tactile interface.

In one example implementation, the tactile layer 110 includes an outer sublayer of polycarbonate base material (constringence $V_d$=~28, index of refraction n=~1.56) and an inner sublayer of silicone base material ($V_d$=~18, n=~1.4); the substrate 120 includes two sublayers of PMMA base material ($V_d$=~52.6, n=~1.5); a touch sensor 160 (described below)—coupled to the substrate 120 opposite the tactile layer 110—includes a sheet of fused silica base material ($V_d$=~67, n=~1.45); a cover layer of a display (described below)—coupled to the touch sensor 160 opposite the substrate 120—includes a layer of PMMA base material ($V_d$=~52.6, n=~1.5); and the fluid 130 is water-based ($V_d$=~73, n=~1.35). In this example implementation, base materials of the foregoing components are of the dynamic tactile interface 100 selectively impregnated, extruded, or molded, etc. with various volumes of (the same or different) particulate to yield a stack exhibiting smoothed transitions of bulk (i.e., "effective") optical characteristics (e.g., Abbe number, index of refraction, constringence, chromatic dispersion, etc.) through the depth and breadth of the stack. For example, a uniform concentration of particulate can be incorporated into the substrate 120, such as by co-molding the substrate 120 with particulate in suspension as described below, thereby yielding a substrate of substantially uniform Abbe number—approximating the Abbe number of the fluid 130 (e.g., $V_d$=~73)—throughout its breadth and depth. Base materials of the touch sensor 160 and the cover layer of the display 170 can also be impregnated with (the same or different type of) particulate such that the touch sensor 160 exhibits Abbe numbers ranging from $V_d$=~67 to $V_d$=~73 as a function of depth and such that the cover layer of the display 170 similarly exhibits Abbe numbers ranging from $V_d$=~56.6 to $V_d$=~67 as a function of depth. The base materials of the sublayers of the tactile layer no can be similarly impregnated with particulate to yield substantially smooth (or relatively smoother) transitions in Abbe numbers from the substrate-tactile layer 110 junction to the tactile layer 110-ambient air junction, as shown in FIG. 3.

Similar methods or techniques can be applied to a stack with fluid channels, fluid ports, etc. filled with oil (e.g., a silicone oil) or other fluid. However, components within the dynamic tactile interface 100 'stack' can be of any other material, and one or more volumes of particulate can be added to, mixed in, suspended within, impregnated into, or otherwise incorporated into base materials of components of the dynamic tactile interface 100 to smooth transitions in one or more optical properties throughout the breadth and thickness of the dynamic tactile interface 100, such as proximal material interfaces within the dynamic tactile interface 100.

Furthermore, because the particulate can be of a substantially small average dimension, the particulate may be substantially visually imperceptible to a user at a normal viewing distance (e.g., at a viewing distance of twelve inches from the tactile surface 115 of the tactile layer 110), and the particulate can thus yield a substantially minimal increase in optical distortion due to particulate occlusion (and/or diffraction, scattering) throughout the dynamic tactile interface 100 relative to a similar dynamic tactile interface 100 excluding such particulate.

However, the dynamic tactile interface 100 can include any other volumes of particulate of any other material and size, and the particulate can be arranged in or incorporated into any element of the dynamic tactile interface 100 in any other suitable way and in any other amount or density.

4. Substrate

The substrate 120 of the dynamic tactile interface 100 is coupled to the tactile layer no at the peripheral region 111, defines the fluid conduit 126 adjacent the peripheral region 111, and defines the fluid channel 125 fluidly coupled to the fluid conduit 126. Generally, the substrate 120 functions to define the fluid channel 125 and the fluid conduit 126 such that fluid can be communicated between the displacement device 150 and the deformable region 112 of the tactile layer no to transition the deformable region 112 between the retracted and expanded settings. In particular, the substrate 120 cooperates with the displacement device 150 and the tactile layer 110 to define a fluid circuit through which fluid can be displaced to selectively transition the deformable region 112 between the expanded setting and the retracted setting to intermittently form a tactile feature on the tactile surface 115 of the tactile layer 110.

As described above and in U.S. patent application Ser. No. 14/035,851, the substrate 120 can include multiple sublayers bonded (or otherwise fastened) together to enclose the fluid channel 125 and to define the fluid conduit 126. For example, one sublayer of the substrate 120 can define an open channel and a through-bore, and a second sublayer 122 of the substrate 120 can be bonded to a back side of the first sublayer 121 to close the open channel and thus define the fluid channel 125. However, the substrate 120 can include a singular layer or any other number of sublayers assembled to define the fluid channel 125 and/or the fluid conduit 126.

The substrate 120 includes one or more (sub)layers of a transparent base material, such as poly(methyl methacrylate), polycarbonate, glass, polyurethane, or silicone. Particulate can thus be added, mixed, impregnated, or suspended, etc. into the base material of the substrate 120 to modify a bulk optical property or characteristic of the substrate 120. For example, once incorporated into the substrate 120, the volume of particulate 140 can function to raise an average refractive index of the substrate 120 (e.g., near 550 nm) while shifting the refractive indices at lower wavelengths and higher wavelengths of light nearer the corresponding refractive indices of the fluid 130 across the visible spectrum. In this example, the substrate 120 base material can be characterized by a first refractive index-wavelength curve, and the fluid 130 can be characterized by a second refractive index-wavelength curve that intersects the first refractive index-wavelength curve at a particular wavelength; inclusion of the particulate in the substrate 120 base material can thus shift the first refractive index-wavelength curve of the substrate 120 nearer to the second refractive index-wavelength curve of the fluid 130.

Figure 2A:
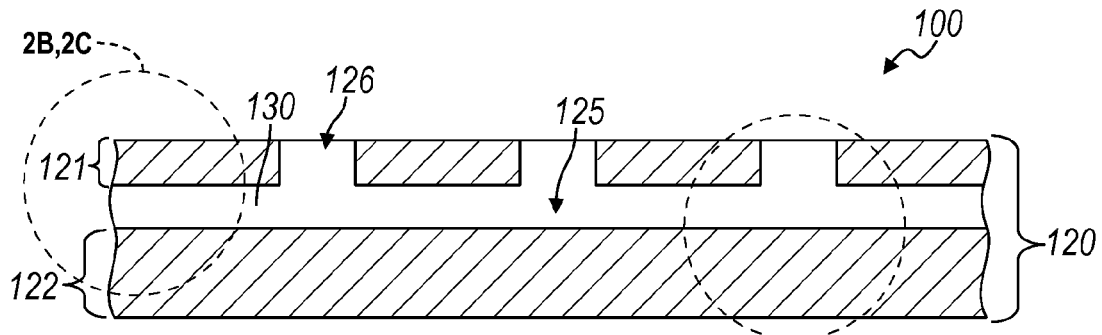
FIGS. 2A-2D are schematic representations of variations of the dynamic tactile interface.
Figure 2B:
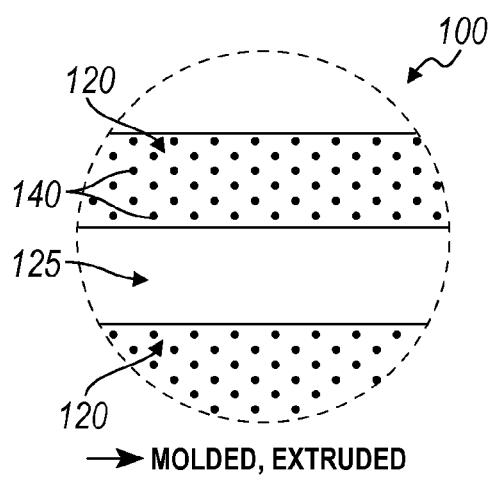

In one implementation, non-agglomerated particulate (e.g., suspended in a solvent) is mixed in solution with uncured polymer (e.g., PMMA, silicone), which is subsequently extruded (or cast) to form a sheet with substantially uniform concentration of particulate throughout its volume, as shown in FIGS. 2A and 2B. The sheet can then be cut to size and machined, etched, stamped, wired EDM'd, or laser ablated, etc. to create the fluid channel 125 and/or fluid conduit before assembly with another sheet (of the same or similar material structure) to form the substrate 120. In a similar implementation in which the particulate is a ceramic capable of withstanding high temperatures, the particulate can be similarly suspended in molten glass (e.g., alkali-aluminosilicate glass), which is then formed into sheet (e.g., over a mercury pool) and cooled to create a glass sheet with substantially uniform distribution of silicate. Non-agglomerated particulate can alternatively be mixed in solution with an uncured polymer, which is then cast in a sublayer mold. The mold form can include a negative fluid channel feature and/or a fluid conduit feature such that, when cured and removed from the mold, the cast substrate includes fluid channel and/or fluid conduit features and can be joined to another cast sublayer to form the substrate 120.

Figure 2C:
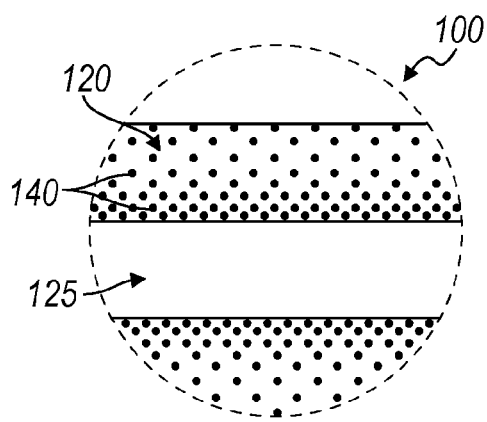

Alternatively, the particulate can be impregnated in the base material of the substrate 120, such as once the substrate 120 with various internal features of the fluid channels, fluid conduits, etc. is fully formed. In one implementation, the substrate 120 base material is bombarded with particulate, such as through sputtering or chemical vapor deposition. In one example of this implementation, the substrate 120 includes a first sublayer 121 and a second sublayer 122, wherein the first sublayer 121 defines an outer surface and an inner surface, includes an open channel feature in the inner surface, and includes a fluid conduit aligned with the open channel and passing through the first sublayer 121 to the outer surface, and wherein the second sublayer 122 is a planar sheet including a mating surface. Prior to assembly of the inner surface of the first sublayer 121 to the mating surface of the second sublayer 122, the inner surface of the first sublayer 121 and the mating surface of the second sublayer 122 are impregnated with particulate by a bombardment process, as shown in FIGS. 2A and 2C.

Figure 2D:
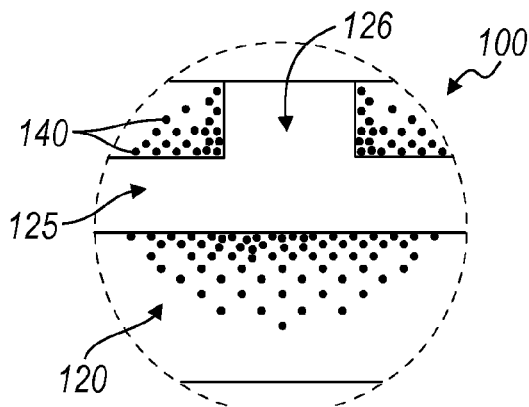

In the foregoing implementation, particulate impregnation by bombardment can yield a non-uniform distribution of particulate within the sublayer, such as with highest concentration of particulate occurring at surfaces nearest a particular target plate (a plate containing particulate for impregnation into the substrate 120 base material). Thus, in the foregoing example, the substrate 120 can feature a highest concentrations of particulate at the inner surface of the first sublayer 121, the surface(s) of the fluid channel 125 and fluid conduit, and the mating surface of the second sublayer 122, and concentrations of particulate can reduce linearly, exponentially, or quadratically, etc. with distance from the substrate-fluid interfaces, as shown in FIG. 2D. In particular, in this example, particulate concentration can be greatest nearest substrate-fluid interfaces but decrease with distance from the substrate-fluid interfaces, and the concentration of particulate at the substrate-fluid interfaces can thus be selected to substantially match the overall refractive index-wavelength curve of the fluid 130. However, because the particulate may increase (or decrease) the average refractive index of the substrate material, gradual reduction in concentration of particulate from the substrate-fluid interfaces may yield a substantially smooth (rather than stepped) transition to a lower average index of refraction of the tactile layer 110 above. Such gradual reduction of the average index of refraction within the substrate 120 may yield less internal reflection and less refraction than large stepped changes in index of refraction within the substrate 120 or across the substrate 120 and the tactile layer 110, thus enabling greater viewing angles of the display 170 and greater screen brightness in comparison to an even distribution of particulate through the substrate 120 given a tactile layer 110 of substantially different average index of refraction.

In a similar example, particulate can be selectively impregnated into the substrate 120, such as by selectively impregnating the substrate 120 near and around the fluid channel 125 and the fluid conduit 126, as shown in FIGS. 2A and 2D. In one example, the inner surface of the first sublayer 121 of the substrate 120 is masked, leaving the fluid channel 125, fluid conduit, and an area around the fluid channel 125 (e.g., 2 mm on each side of the fluid channel 125) exposed. This exposed area of the first sublayer 121 is then impregnated with particulate (e.g., by sputter deposition), and the mask is then removed and the first sublayer 121 assembled over the second sublayer 122. In this example, the regions of the second sublayer 122 adjacent particulate-impregnated regions of the first sublayer 121 can also be selectively impregnated, such as around the fluid channel 125 through similar methods, thereby smoothing a gradient of refractive indices from the second sublayer 122 through the first sublayer 121.

In another implementation, the volume of particulate 140 is thoroughly mixed into a volume of uncured base material, and the substrate 120 is then cast from the particulate-base material mixture. As the cast particulate-base material mixture cures, it is exposed to heat, thus causing the particulate to "bloom" or rise to a surface of the casting and thereby yielding a density of particulate within the substrate 120 that varies with depth through the substrate. For example, in this implementation, the volume of particulate 140 can include polyvinylidene fluoride (PVFD) nanoparticles, and the substrate can be of poly(methyl methacrylate) (PMMA). However, a gradient in concentration of particulate can be achieved in the substrate 120 (and/or in the tactile layer 110) in any other suitable way.

5. Volume of Fluid

The volume of transparent fluid 130 is contained within the fluid channel 125 and the fluid conduit 126. Generally, the volume of transparent is manipulatable by the displacement device 150 to selectively transition the deformable region 112 between the expanded setting and the retracted setting. For example, the displacement device 150 can pump fluid into the fluid channel 125 within the substrate 120 to expand the deformable region 112, thereby transitioning the deformable region 112 from the retracted setting into the expanded setting, and the displacement device 150 can pump fluid out of the fluid channel 125 to retract the deformable region 112, thereby transitioning the deformable region 112 from the expanded setting back into the retracted setting The volume of fluid 130 can exhibit an optical dispersion characteristic different from the optical dispersion characteristic of the substrate 120 and/or the tactile layer no. For example, the tactile layer no can exhibit (e.g., be characterized by) a first index of refraction at a particular wavelength (at a particular operating temperature), the substrate 120 can exhibit a second index of refraction at the particular wavelength (and at the particular operating temperature) different from the first index of refraction, and the volume of fluid 130 can exhibit a third index of refraction at the particular wavelength (and at the particular operating temperature) different from the first and second indices of refraction. In another example, the tactile layer 110 can be characterized by a first Abbe number, the substrate 120 can be characterized a second Abbe number different from the first Abbe number, and the volume of fluid 130 can be characterized a third Abbe number different from the first and second Abbe numbers. Particulate can thus be added to the tactile layer 110, the substrate 120, and/or the volume of fluid 130 to better match the bulk indices of refraction at a particular wavelength, Abbe numbers, constringence values, optical dispersion characteristics, etc. of materials within the dynamic tactile interface 100.

In one implementation, particulate is dispersed into the fluid 130 to modify the bulk Abbe number of the fluid 130 to better match the Abbe number of the substrate 120 and/or the tactile layer 110 that define boundaries of the fluid 130. For example, particulate of a suitably small size and of a density approximating that of the fluid 130 can be added to and substantially uniformly mixed into the fluid 130 such that the particulate does not separate from the fluid 130. The proportion of particulate to fluid can be selected to achieve a target bulk Abbe number in the fluid 130, such as described above.

Furthermore, as described above, an optical property of the volume of fluid 130, the substrate 120, and/or the tactile layer 110 can vary with an operating temperature of the dynamic tactile interface 100. In particular, densities (or concentrations) of the volume of fluid 130, the substrate 120, and the tactile layer 110 can vary with temperature, and index of refraction, Abbe number constringence, chromatic dispersion, and/or other characteristic or property of a material can vary with density. Therefore, particulate can be incorporated into one or more base materials of the dynamic tactile interface 100 to better match coefficients of thermal expansion between adjacent base materials of the dynamic tactile interface 100.

Generally, fluids generally exhibit greater positive coefficients of thermal expansion than do solids. Therefore, particulate exhibiting a negative coefficient of thermal expansion (or a coefficient of thermal expansion less than that of the substrate 120) can thus be added to (e.g., commingled with) the volume of fluid 130 such that a bulk coefficient of thermal expansion of the fluid 130/particulate 140 better approximates the coefficient of thermal expansion of the substrate 120. In this implementation, the particulate can exhibit negative thermal expansion within a limited temperature range, such as over an operating temperature range of the dynamic tactile layer 110 and/or a computing device coupled to the dynamic tactile interface 100 (e.g., 0° to 35° C. (32° to 95° F.)). Alternatively, particulate exhibiting a positive coefficient of thermal expansion exceeding a (bulk) coefficient of thermal expansion of the volume of fluid 130 can be incorporated into the substrate 120 such that a bulk coefficient of thermal expansion of the substrate 120/particulate better approximates the coefficient of thermal expansion of the volume of fluid 130.

However, any other type and/or quantity of particulate can be added to or otherwise incorporated into the volume of fluid 130 to better match optical properties of the volume of fluid 130 and an adjacent material of the dynamic tactile interface 100 for a particular wavelength and a particular temperature, over a range of wavelengths, and/or over a range of temperatures.

6. Tactile Layer

The tactile layer no defines the peripheral region 111 and the deformable region 112 adjacent the peripheral region 111. As described in U.S. application Ser. No. 14/035,851, the tactile layer 110 is attached to the substrate 120 at the peripheral region 111 and is disconnected from the substrate 120 adjacent the fluid conduit 126 such that fluid displaced through the fluid conduit 126 toward the tactile layer 110 outwardly deforms the deformable region 112 of the tactile layer 110, thereby transitioning the deformable region 112 from the retracted setting (shown in FIG. 1A) into the expanded setting (shown in FIG. 1B) to yield a tactilely distinguishable formation at the tactile surface 115. The tactilely distinguishable formation defined by the deformable region 112 in the expanded setting can be dome-shaped, ridge-shaped, ring-shaped, or of any other suitable form or geometry. When fluid is (actively or passively) released from behind the deformable region 112 of the tactile layer 110, the deformable region 112 transitions back into the retracted setting (shown in FIG. 1A).

In the retracted setting, the deformable region 112 can be flush with the peripheral region 111. For example, the substrate 120 can define a substantially planar surface across an attachment surface and a support surface that faces the tactile layer 110, the attachment surface retaining the peripheral region 111 of the tactile layer 110, and the support surface adjacent and substantially continuous with the attachment surface and supporting the deformable region 112 against substantial inward deformation (e.g., due to an input applied to the tactile surface 115 at the deformable region 112). In this example, the substrate 120 can define fluid conduit through the support surface, and the attachment surface can retain the peripheral region 111 in substantially planar form. The deformable region 112 can rest on and/or be supported in planar form against the support surface in the retracted setting, and the deformable region 112 can be elevated off of the support surface in the expanded setting. The support surface can thus support the deformable region 112 of the tactile layer 110 against inward deformable passed the plane of the attachment surface.

The tactile layer 110 can be of a singular material, such as a silicone or polyurethane elastomer, PMMA, or polycarbonate. As described above, the tactile layer 110 can alternatively include sublayers of similar or dissimilar materials. For example, the tactile layer 110 can include a silicone elastomer sublayer adjacent the substrate 120 and a polycarbonate sublayer joined to the silicone elastomer sublayer and defining the tactile surface 115. As described above, optical properties of the tactile layer 110 can be modified by impregnating, extruding, molding, or otherwise incorporating particulate (e.g., metal oxide nanoparticles) into the layer and/or one or more sublayers of the tactile layer 110.

The tactile layer 110 can also be extruded, molded, or impregnated with particulate to yield a different bulk optical property (e.g., constringence value, Abbe number, etc.), such as to better match the (bulk) optical property of the adjacent substrate, the volume fluid, and ambient air. For example, the tactile layer 110 can include a first sublayer 113 and a second sublayer 114, the first sublayer 113 coupled to the substrate 120 and exhibiting a first index of refraction, and the second sublayer 114 coupled (e.g., adhered) to the first sublayer 113 and exposed to ambient air, as shown in FIGS. 3 and 6. In this example, a volume of particulate 140 can be arranged within the second sublayer 114 and cooperate with the second sublayer 114 to exhibit a bulk index of refraction between the first index of refraction of the first sublayer 113 of the tactile layer 110 and an index of refraction of ambient air, such as for a particular wavelength of light in the visible spectrum at a temperature within an operating temperature range of the computing device. In this example, the volume of particulate 140 can further cooperate with the second sublayer 114 to exhibit a bulk Abbe number between a (bulk) Abbe number of the first sublayer 113 of the tactile layer 110 and an Abbe number of ambient air, such as for a particular temperature within an operating temperature range of the computing device, as described below.

However, the tactile layer 110 can be of any other suitable material and can function in any other way to yield a tactilely distinguishable formation at the tactile surface 115.

7. Displacement Device

The displacement device 150 of the dynamic tactile interface 100 displacing fluid into the fluid channel 125 to transition the deformable region 112 from the retracted setting into an expanded setting, the deformable region 112 defining the formation tactilely distinguishable from the peripheral region 111 in the expanded setting. Generally, the displacement device 150 functions to displace fluid into and out of the fluid channel 125 to transition the deformable region 112 between the expanded setting and the retracted setting, respectively. As described above, the deformable region 112 can be substantially flush with the peripheral region 111 in the retracted setting and can be offset above the peripheral region 111 in the expanded setting. The displacement device 150 can therefore manipulate the volume of fluid 130 within the fluid channel 125 and the fluid conduit 126 (e.g., by pumping fluid into and out of the fluid channel 125 and the fluid conduit 126) to adjust a vertical position of the deformable region 112 above the peripheral region 111, a firmness of the deformable region 112, and/or a shape of the deformable region 112, etc.

In one variation, the tactile layer 110 further defines a second deformable region 112 adjacent the peripheral region 111; the substrate 120 defines a second fluid conduit adjacent the second peripheral region 111 and fluidly coupled to the fluid channel 125; the volume of transparent fluid 130 is further contained within the second fluid conduit; and the displacement device 150 displaces fluid into the fluid channel 125 to transition the deformable region 112 and the second deformable region 112 from the retracted setting into the expanded setting substantially simultaneously. For example, in this variation, the (first) and second deformable regions can function as transient hard keys corresponding to discrete virtual keys of a virtual keyboard rendered on a display coupled to the dynamic tactile interface 100, and the displacement device 150 can displace fluid into and out of the fluid channel 125 to transition the (first), second, and other deformable regions correspond to the virtual keyboard substantially simultaneously.

The displacement device 150 can include an electromechanically-actuated pump, an electroosmotic pump, a manually-actuated pump, or any other suitable pump or mechanism suitable for actively displacing fluid into and/or out of the substrate 120. However, the displacement device 150 can include any other suitable type of device that functions in any other way to transition the deformable region(s) 112 between the expanded and retracted settings.

8. Display

Figure 1A:
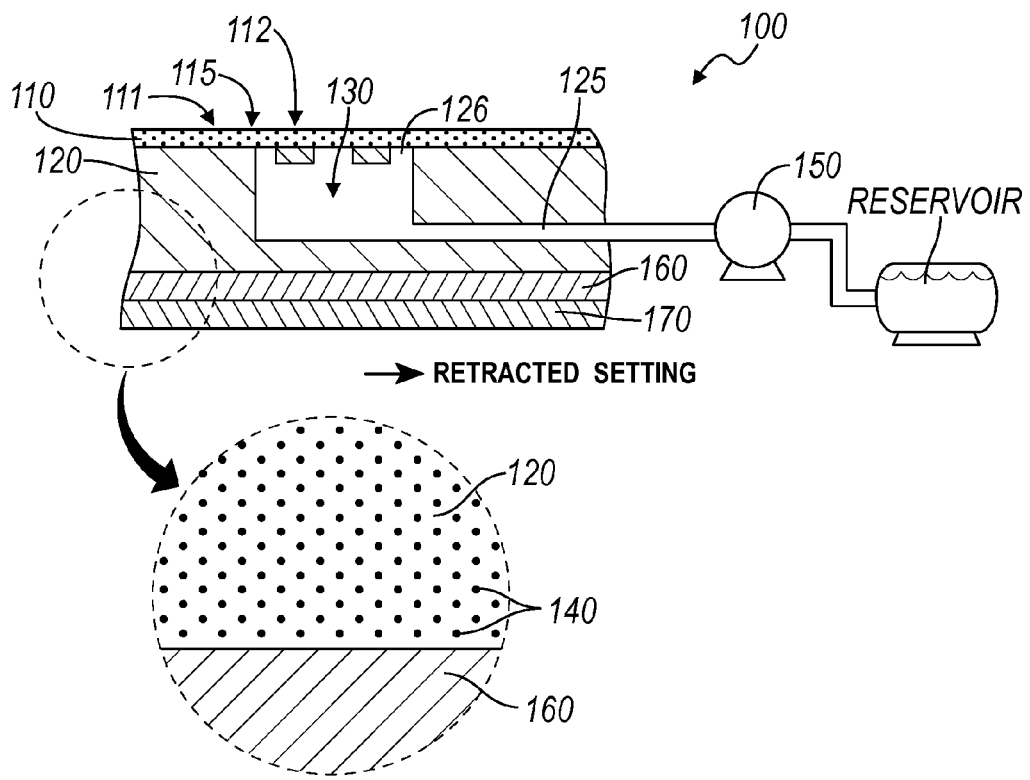
FIGS. 1A and 1B are schematic representations of a dynamic tactile interface of one embodiment of the invention.
Figure 1B:
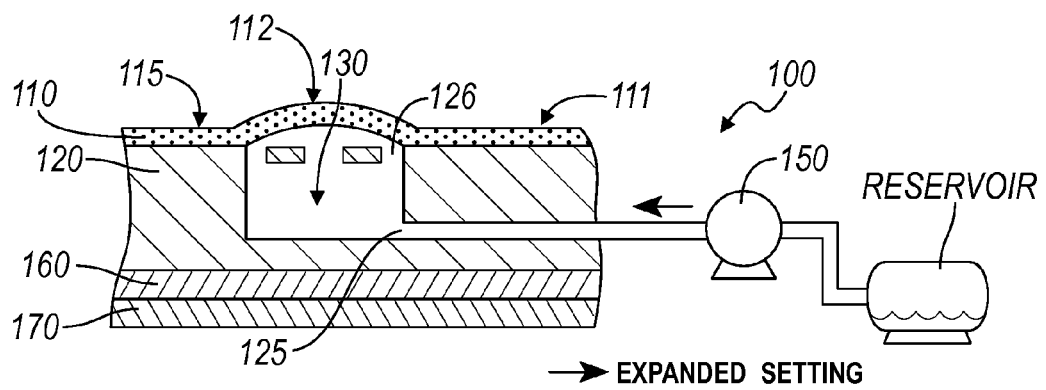

As shown in FIG. 1A, one variation of the dynamic tactile interface 100 further includes a display coupled to the substrate 120 opposite the tactile layer 110 and configured to display an image of a key substantially aligned with the deformable region 112. Generally, the display 170 functions to transmit light in the form of an image through the substrate 120 and the tactile layer 110. For example, the display 170 can render an image of an alphanumeric input key of a keyboard aligned with the deformable region 112, thereby indicating an input associated with the deformable region 112. In this example, when the deformable region 112 is in the expanded setting and the display 170 outputs an image of the alphanumerical character "a", selection of the deformable region 112—sensed by the touch sensor 160—can be correlated with selection of the character "a", and the mobile computing device incorporating the dynamic tactile interface 100 can response to the input by adding the character "a" in a text field (e.g., with a SMS text messaging application executing on the mobile computing device). However, the display 170 can function in any other way to display an image of any other type.

In one implementation, the display 170 of the dynamic tactile interface 100 is coupled (e.g., joined adhered, assembled) to the substrate 120 opposite the tactile layer 110. In this implementation, a cover layer of the display 170 can be characterized by a first Abbe number (or first index of refraction) different from a second (bulk) Abbe number characteristic (or second bulk index of refraction) of the substrate 120. In this implementation, particulate can be molded, impregnated, or other incorporated into the cover layer of the display 170 and/or across a back surface of the substrate 120 such that the (bulk) Abbe number of the cover layer better approximates the (bulk) Abbe number of the substrate 120 across the junction between the cover layer and the substrate 120, as shown in FIG. 3. For example, in the implementation above in which the substrate 120 is cast in a polymer with particulate in suspension, the cover layer of the display 170 can be impregnated with particulate across its outer surface to achieve a bulk Abbe number approximating the (bulk) Abbe number of across the adjacent surface of the substrate 120. In particular, by impregnating the cover layer with particulate, the cover layer and the substrate 120 can cooperate to exhibit a relatively smooth transition from the (bulk) Abbe number of the cover glass to the (bulk) Abbe number of the substrate 120. Furthermore, volumes of the same or dissimilar particulate can be impregnated at constant or varying densities throughout the remainder of the substrate 120, throughout the tactile layer 110 (and sublayers), within the volume of fluid 130, and/or around the fluid channel 125 and fluid conduits, etc. to achieve a substantially smooth gradient of Abbe numbers (i.e., refractive indices as a function of wavelength) throughout the depth of the dynamic tactile interface 100 from the display 170 through the tactile layer 110, as shown in FIG. 3, and laterally across the breadth of the dynamic tactile interface 100.

9. Sensor

As shown in FIG. 1A, one variation of the dynamic tactile interface 100 further includes a touch sensor 160 coupled to the substrate 120 and outputting a signal corresponding to an input on the tactile surface 115 adjacent the deformable region 112. Generally, the touch sensor 160 functions to output a signal corresponding to an input on the tactile surface 115, such as on the peripheral and/or on the deformable region 112.

In one implementation, the touch sensor 160 includes a capacitive, resistive, optical, or other suitable type of touch sensor 160 arranged (i.e., interposed) between the display 170 and the substrate 120. In this implementation, like the display 170 and/or the substrate 120, the touch sensor 160 can be impregnated with particulate to yield a substantially smooth Abbe number gradient (or a substantially smooth gradient of any other optical property or characteristic) across a junction between the touch sensor 160 and the substrate 120 and across a junction between the touch sensor 160 and the display 170. Similarly, the touch sensor 160 can includes a sheet of transparent material exhibiting a first index of refraction different from a second index of refraction of a base material of an adjacent sublayer of the substrate 120; and a second volume of particulate can be arranged within (e.g., impregnated into) the adjacent sublayer of the substrate 120 and can cooperate with the adjacent sublayer to exhibit a bulk index of refraction approximating the first index of refraction of the sheet of the touch sensor 160 (e.g., for a particular wavelength of light in the visible spectrum).

In this variation, the display 170 can be coupled to the touch sensor 160 opposite the substrate 120. Alternatively, the touch sensor 160 can be integrated into the display 170 to form a touchscreen. For example, the display 170 can render an image of a virtual input key substantially aligned with the deformable region 112 in the expanded setting, and the touch sensor 160 can output a signal corresponding to an input on the tactile surface 115 adjacent the deformable region 112. However, the touch sensor 160 can be arranged at any other depth with the dynamic tactile interface 100 and/or can be incorporated into (e.g., physically coextensive with) any other component of the dynamic tactile interface 100.

10. Housing

Figure 7:
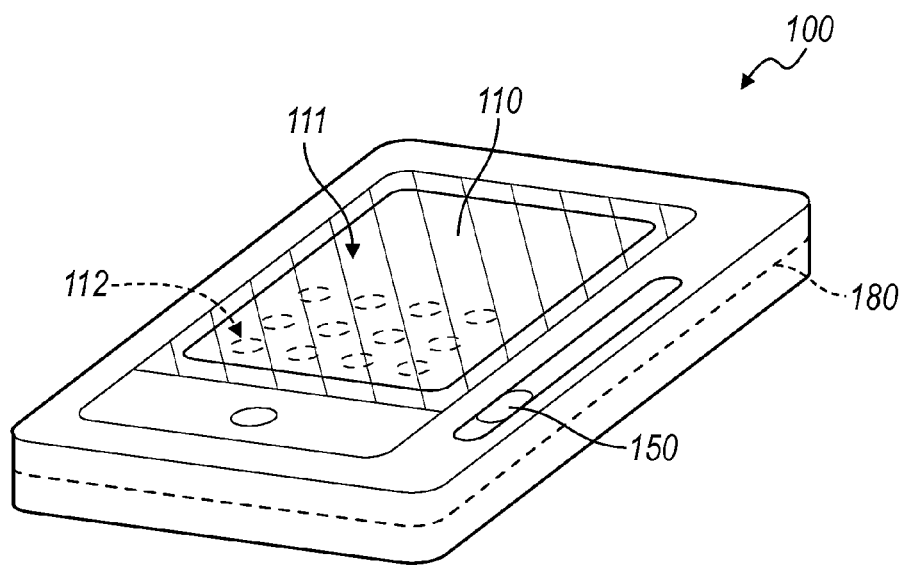
FIG. 7 is a schematic representation of one variation of the dynamic tactile interface.

As shown in FIG. 7, one variation of the dynamic tactile interface 100 further includes a housing 180 transiently engaging a mobile computing device and transiently retaining the substrate 120 over a digital display 170 of the mobile computing device. Generally, in this variation, the housing 180 functions to transiently couple the dynamic tactile interface 100 over a display (e.g., a touchscreen) of a discrete (mobile) computing device, such as described in U.S. patent application Ser. No. 12/830,430. For example, the dynamic tactile interface 100 can define an aftermarket device that can be installed onto a mobile computing device (e.g., a smartphone, a tablet) to update functionality of the mobile computing device to include transient depiction of physical guides or buttons over a touchscreen of the mobile computing device. In this example, the substrate 120 and tactile layer no can be installed over the touchscreen of the mobile computing device, a manually-actuated displacement device 150 can be arranged along a side of the mobile computing device, and the housing 180 can constrain the substrate 120 and the tactile layer no over the touchscreen and can support the displacement device 150. However, the housing 180 can be of any other form and function in any other way to transiently couple the dynamic tactile interface 100 to a discrete computing device.

As a person skilled in the art will recognize from the previous detailed description and from the figures and claims, modifications and changes can be made to the preferred embodiments of the invention without departing from the scope of this invention as defined in the following claims.

We claim:

1. A dynamic tactile interface for a computing device, comprising:
   a tactile layer defining a peripheral region and a deformable region adjacent the peripheral region;

a substrate comprising one or more sublayers formed of a transparent base material exhibiting a first optical dispersion characteristic, coupled to the tactile layer at the peripheral region, defining a fluid conduit adjacent the peripheral region, and defining a fluid channel fluidly coupled to the fluid conduit;

a volume of transparent fluid contained within the fluid channel and the fluid conduit, the volume of transparent fluid exhibiting a second optical dispersion characteristic different from the first optical dispersion characteristic;

a volume of particulate contained completely outside the fluid conduit and within one of the one or more sublayers of the substrate formed by the transparent base material is biased around an exterior of the fluid conduit, the volume of particulate exhibits a third optical dispersion characteristic different from the first optical dispersion characteristic, the volume of particulate having an optical property that globally modifies a bulk optical property of a base material containing the particulate to yield smoother transitions in the optical property between adjacent materials in the dynamic tactile interface, the volume of transparent fluid and the volume of particulate cooperate to exhibit a bulk thermal expansion coefficient approaching the first thermal expansion coefficient of the transparent material of the substrate; and a displacement device displacing fluid into the fluid channel to transition the deformable region from a retracted setting into an expanded setting, the deformable region defining a formation tactilely distinguishable from the peripheral region in the expanded setting.

2. The dynamic tactile interface of claim 1, further comprising a display coupled to the substrate opposite the tactile layer and displaying an image of a key substantially aligned with the deformable region.

3. The dynamic tactile interface of claim 1, further comprising a touch sensor coupled to the substrate and outputting a signal corresponding to an input on a tactile surface of the tactile layer adjacent the deformable region.

4. The dynamic tactile interface of claim 1, wherein a portion of the volume of particulate within the substrate proximal the fluid conduit cooperates with the transparent base material of the substrate to approximate the second optical dispersion characteristic of the volume of transparent fluid proximal the fluid conduit.

5. The dynamic tactile interface of claim 4, wherein the transparent base material is characterized by a first constringence value, wherein the volume of transparent fluid is characterized by a second constringence value less than the first constringence value, wherein particulate in the volume of particulate is characterized by a third constringence value less than the second constringence value, and wherein a portion of the substrate and a portion of the volume of particulate proximal a surface of the fluid conduit cooperate to exhibit a fourth constringence value approaching the second constringence value.

6. The dynamic tactile interface of claim 1, wherein the volume of particulate comprises a volume of metal-oxide particulate exhibiting maximum dimensions less than 100 nanometers.

7. The dynamic tactile interface of claim 6, wherein the volume of particulate comprises indium tin oxide particulate.

8. The dynamic tactile interface of claim 1, wherein the volume of particulate is preferentially impregnated into the transparent base material of the substrate around the fluid channel and the fluid conduit.

9. The dynamic tactile interface of claim 1, wherein the deformable region is substantially flush with the peripheral region in the retracted setting and is offset above the peripheral region in the expanded setting.

10. A dynamic tactile interface for a computing device, comprising:

a tactile layer defining a peripheral region and a deformable region adjacent the peripheral region, the tactile layer comprising a first transparent material exhibiting a first index of refraction;

a substrate comprising sublayers including a first sublayer and a second sublayer, the first sublayer coupled to the tactile layer at the peripheral region, the second sublayer adjacent the first sublayer opposite the tactile layer and comprising a second transparent material of a second index of refraction, the substrate defining a fluid conduit adjacent the peripheral region and a fluid channel fluidly coupled to the fluid conduit;

a volume of particulate arranged completely outside the fluid conduit and within the first sublayer, the volume of particulate and the first sublayer cooperating to exhibit a bulk index of refraction between the first index of refraction and the second index of refraction for a particular wavelength of light in the visible spectrum, the volume of particulate having an optical property that globally modifies a bulk optical property of a base material containing the particulate to yield smoother transitions in the optical property between adjacent materials in the dynamic tactile interface, the volume of transparent fluid and the volume of particulate cooperate to exhibit a bulk thermal expansion coefficient approaching the first thermal expansion coefficient of the transparent material of the substrate;

a volume of transparent fluid contained within the fluid channel and the fluid conduit; and a displacement device displacing fluid into the fluid channel to transition the deformable region from a retracted setting into an expanded setting, the deformable region defining a formation tactilely distinguishable from the peripheral region in the expanded setting.

11. The dynamic tactile interface of claim 10, wherein the volume of particulate is impregnated in the first sublayer at a density varying with depth through the first sublayer, a first portion of the volume of particulate and the first sublayer adjacent the tactile layer cooperating to exhibit a bulk index of refraction approximating the first index of refraction, and a second portion of the volume of particulate and the first sublayer adjacent the second sublayer cooperating to exhibit a bulk index of refraction approximating the second index of refraction.

12. The dynamic tactile interface of claim 11, wherein the volume of transparent fluid exhibits a third index of refraction, and wherein a third portion of the volume of particulate and the first sublayer adjacent the fluid channel cooperate to exhibit a bulk index of refraction approximating the third index of refraction for the particular wavelength of light in the visible spectrum.

13. The dynamic tactile interface of claim 10, further comprising a touch sensor coupled to the second sublayer of the substrate opposite the first sublayer and outputting a signal corresponding to an input on the tactile layer adjacent the deformable region, and further comprising a display coupled to the touch sensor opposite the substrate and displaying an image of a key substantially aligned with the deformable region.

14. The dynamic tactile interface of claim 13, wherein the touch sensor comprises a sheet of transparent material exhibiting a third index of refraction, further comprising a second volume of particulate arranged within the second sublayer, a portion of the second volume of particulate and the second sublayer proximal the sheet cooperating to exhibit a bulk index of refraction approximating the third index of refraction for the particular wavelength of light in the visible spectrum.

15. The dynamic tactile interface of claim 10, wherein the volume of particulate comprises indium tin oxide particulate of maximum dimensions less than 100 nanometers.

16. The dynamic tactile interface of claim 10, wherein the tactile layer comprises a third sublayer and a fourth sublayer, the third sublayer adjacent the first layer of the substrate and exhibiting the first index of refraction, and the fourth sublayer coupled to the third sublayer and exposed to ambient air, and further comprising a second volume of particulate arranged within the fourth sublayer, the second volume of particulate and the fourth sublayer cooperating to exhibit a bulk index of refraction between the first index of refraction and an index of refraction of ambient air for a particular wavelength of light in the visible spectrum at a temperature within an operating temperature range of the computing device.

17. A dynamic tactile interface for a computing device, comprising:
   a tactile layer defining a peripheral region and a deformable region adjacent the peripheral region, the tactile layer comprising a first sublayer and a second sublayer, the first sublayer of a transparent material exhibiting a first index of refraction;
   a substrate comprising one or more sublayers and coupled to the second sublayer opposite the first sublayer, defining a fluid conduit adjacent the peripheral region and a fluid channel fluidly coupled to the fluid conduit, and comprising a transparent material exhibiting a second index of refraction;
   a volume of particulate arranged completely outside the fluid conduit and within the second sublayer, the volume of particulate and the second sublayer cooperating to exhibit a bulk index of refraction between the first index of refraction and the second index of refraction for a particular wavelength of light in the visible spectrum, the volume of particulate having an optical property that globally modifies a bulk optical property of a base material containing the particulate to yield smoother transitions in the optical property between adjacent materials in the dynamic tactile interface, the volume of transparent fluid and the volume of particulate cooperate to exhibit a bulk thermal expansion coefficient approaching the first thermal expansion coefficient of the transparent material of the substrate;
   a volume of transparent fluid contained within the fluid channel and the fluid conduit; and
   a displacement device displacing fluid into the fluid channel to transition the deformable region from a retracted setting into an expanded setting, the deformable region defining a formation tactilely distinguishable from the peripheral region in the expanded setting.

* * * * *